US010755178B2

(12) United States Patent
Mizuno et al.

(10) Patent No.: US 10,755,178 B2
(45) Date of Patent: Aug. 25, 2020

(54) SYSTEM AND METHOD FOR DETERMINING CREDIBILITY OF INFORMATION BASED ON MANY REMARKS ON A NETWORK, AND NON-TRANSITORY COMPUTER READABLE STORAGE MEDIUM HAVING STORED THEREON COMPUTER PROGRAM THEREFOR

(71) Applicant: National Institute of Information and Communications Technology, Tokyo (JP)

(72) Inventors: Junta Mizuno, Tokyo (JP); Kentaro Torisawa, Tokyo (JP); Kiyonori Ootake, Tokyo (JP); Chikara Hashimoto, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 675 days.

(21) Appl. No.: 15/446,515

(22) Filed: Mar. 1, 2017

(65) Prior Publication Data

US 2017/0262754 A1    Sep. 14, 2017

(30) Foreign Application Priority Data

Mar. 8, 2016 (JP) ................................. 2016-044072

(51) Int. Cl.
*G06N 5/02* (2006.01)
*G06F 16/903* (2019.01)
(Continued)

(52) U.S. Cl.
CPC ......... *G06N 5/02* (2013.01); *G06F 16/90335* (2019.01); *G06F 40/30* (2020.01); *G06N 5/04* (2013.01)

(58) Field of Classification Search
CPC .... G06F 16/36; G06F 16/335; G06F 16/2455; G06F 16/9537; G06F 16/90335;
(Continued)

(56) References Cited

U.S. PATENT DOCUMENTS 9,043,329 B1 * 5/2015 Patton ................... G06F 16/285
707/740
10,198,503 B2 * 2/2019 Sweeney ............. G06F 17/2785
(Continued)

OTHER PUBLICATIONS

Lee, Ryong, and Kazutoshi Sumiya. "Measuring geographical regularities of crowd behaviors for Twitter-based geo-social event detection." Proceedings of the 2nd ACM SIGSPATIAL international workshop on location based social networks. ACM, pp. 1-10. (Year: 2010).*

(Continued)

*Primary Examiner* — Kamran Afshar
*Assistant Examiner* — Randall K. Baldwin
(74) *Attorney, Agent, or Firm* — Renner, Otto, Boisselle & Sklar, LLP

(57) ABSTRACT

A credibility determining system enabling highly accurate credibility determination of given information includes causal relation knowledge DB 90 and search scope constraint DB 88. Causal relation knowledge each includes a combination of cause and result parts, and time and position constraints associated with the causal relation. The credibility determining system further includes a query generating unit 92 retrieving a causal relation matching the input information and based on the time and position constraints stored in search scope constraint DB 88 in association with the retrieved causal relation, generating a query for retrieving remarks from mini-blog text DB 84, a text search unit 96 searching for related remarks from mini-blog text DB 84 using the query, and a display candidate selecting unit 100 classifying the searched remarks to expressions interpreted
(Continued)

as causes or to results, determining credibility of the input information based on the classification result and outputting the determination result.

18 Claims, 11 Drawing Sheets

(51) Int. Cl.
*G06N 5/04* (2006.01)
*G06F 40/30* (2020.01)

(58) Field of Classification Search
CPC .......... G06F 17/2785; G06F 8/36; G06F 8/75; G06N 5/02; G06N 5/04
See application file for complete search history.

(56) References Cited

U.S. PATENT DOCUMENTS

| | | | | |
|---|---|---|---|---|
| 2013/0007124 A1* | 1/2013 | Sweeney | ............. | G06F 17/2785 709/204 |
| 2013/0326365 A1* | 12/2013 | Rudenstine | ........... | G06F 3/0484 715/751 |
| 2015/0066834 A1* | 3/2015 | Jeffries | ................ | H04N 19/463 706/52 |

OTHER PUBLICATIONS

Lingad, John, Sarvnaz Karimi, and Jie Yin. "Location extraction from disaster-related microblogs." Proceedings of the 22nd international conference on world wide web. ACM, 2013, pp. 1017-1020. (Year: 2013).*

Ostermann, F. "Hybrid geo-information processing: Crowdsourced supervision of geo-spatial machine learning tasks." Proceedings of the 18th AGILE International Conference on Geographic Information Science, Lisbon, Portugal. (Year: 2015).*

Thom, Dennis, et al. "Can twitter really save your life? A case study of visual social media analytics for situation awareness." 2015 IEEE Pacific Visualization Symposium (PacificVis). IEEE, pp. 183-190. (Year: 2015).*

Russell, Stuart Jonathan, and Peter Norvig. Prentice Hall Series in Artificial Intelligence. Englewood Cliffs, NJ:: Prentice Hall, 1995: 194-374 (Year: 1995).*

Huang, Xinlin, et al. "A systematic fault root causes tracing method for process systems." 2011 Proceedings-Annual Reliability and Maintainability Symposium. IEEE (Year: 2011).*

National Research and Development Agency, National Institute of Information and Communications Technology, Knowledge Processing Group, Information Credibility Project., "The Information System Wisdom," ISBN 97 8-4-9042-01-2. National Research and Development Agency, National Institute of Information and Communications Technology, Knowledge Processing Group, 3-5 Hikaridai, Seika-cho, Soraku-gun, Kyoto, pp. 17-18, Mar. 31, 2011 and Partial English Translation (cited in the specification).

K. Murakami et al., "Generating Statement Maps for Capturing Supportive and Contrastive Relations between Statements", IPSJ Technical Reports, Natural Language Processing/Natural Language Understanding and Models of Communication Joint Study, IEICE Technical Reports, vol. 108 No. 141, 2008-NL-186, pp. 55-60, Jul. 2008 (cited in the specification).

Rob Ennals et. al., "Highlighting disputed claims on the web", Proceedings of WWW2010. pp. 341-350, 2010 (cited in the specification).

K. Murakami et al., "Statement Map: Assisting Information Credibility Analysis by Visualizing Arguments", Proceeding of WI COW '09, pp. 43-50, Apr. 2009 (cited in the specification).

* cited by examiner

Fig. 1

DISASTER INFORMATION ANALYSIS SYSTEM FOR SNS

INPUT A QUESTION, AND SEARCH ANSWER CANDIDATES

CLICK HERE TO SHOW A LIST OF ANSWER CANDIDATS

MAP SHOWS POSITIONS OF ANSWER CANDIDATES

MAP|PHOTO

LEGENDS
- ANSWER CANDIDATES
- PREDICTION TWEETS
- INFERENCE TWEETS
- CONTRADICTORY TWEETS
- COUNTERMEASURE TWEETS
CLICK PINS TO SHOW THE ANSWER CANDIDATE

FIG. 3

DISASTER INFORMATION ANALYSIS SYSTEM FOR SNS — 42

WHERE IS ISOLATED — 48

CLICK TO MAP POSITIONS RELATED TO ANSWER CANDIDATES | SHOWING LIST OF ANSWER CANDIDATES

CLICK CANDIDATE TO SHOW ITS ORIGINAL TWEET. DO NOT FAIL TO VERIFY THE CANDIDATE IS TRUE BY THE ORIGINAL TWEET.

(New Orleans (1)) (Laplace (2)) (Slidell (3)) (Belle Chasse (2)) (Lakefront Airport (1)) (Baton Rouge (1))
(Ohio (11)) (Memphis (1)) (Oxford (3)) (Greenville (1)) (Indonesia (1)) (Branson (1)) (Buena Vista (1)) (Sparta (1))
(Jackson (4)) (Cleveland, Ohio (1)) (Collierville (11)) (China (7)) (Nashville, Tennessee (1)) (Atlanta (2))
(Rout 129 (7)) (Alexandria (1)) (Fort Adams (15)) (Japan (4)) (St Francisville (1)) (Jackson (4)) (Clinton
(Louisiana (1)) (Germany (1)) (district (1)) (Little Rock (16)) (CDC (1)) (Hiroshima (1)) (East Coast (1))
(Natchez (1)) (St Louis (1)) (Branson (13)) (French Quarter (15)) (Hot Springs (15)) (Local Cities
(Vicksburg (2)) (Biloxi (1)) (French Quarter (15)) (Kolgore (1)) (Trout (1)) (Ishere (118)) (Kent

— 44

LEGENDS   CLOSE
☐ ANSWER CANDIDATES
☐ POSITIONS OF PREDICTION TWEETS
☐ POSITIONS OF INFERENCE TWEETS
○ POSITIONS OF CONTRADICTORY TWEETS

— 40, 46

FIG. 10
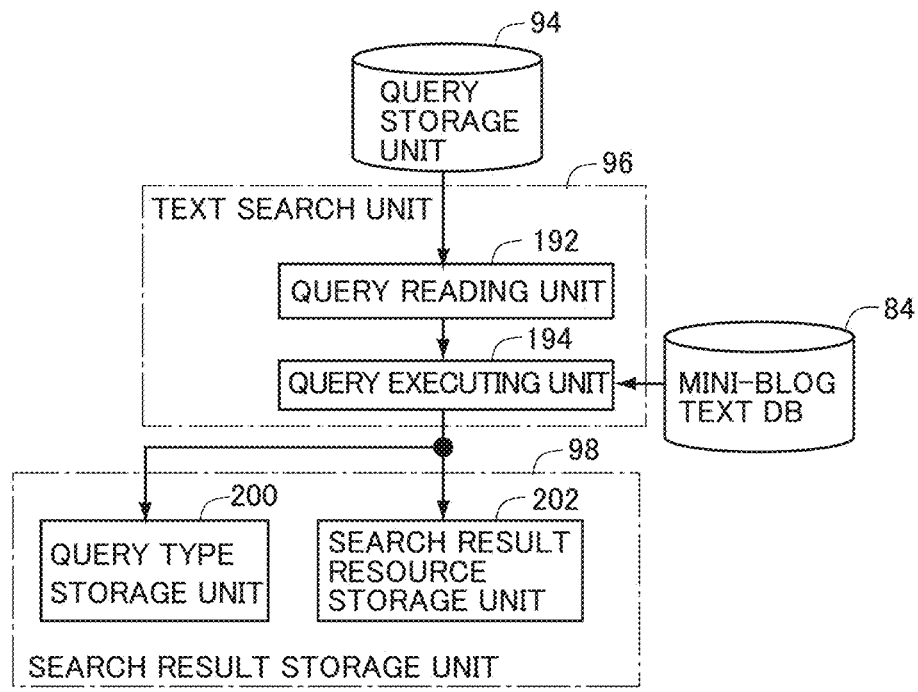
FIG. 12
(A) DETERMINE CREDIBILITY OF "POWER OUTAGE"
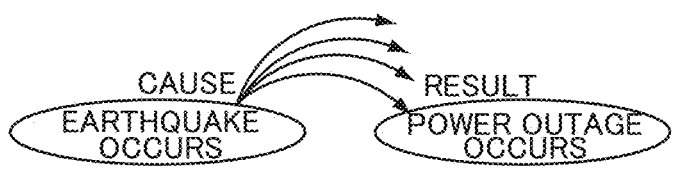
(B) DETERMINE CREDIBILITY OF "EARTHQUAKE OCCURS"
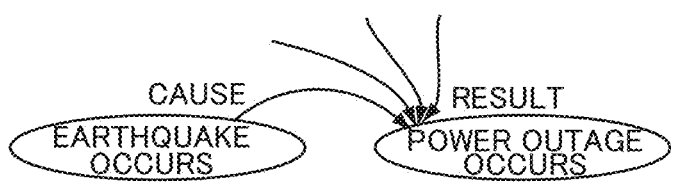

SYSTEM AND METHOD FOR DETERMINING CREDIBILITY OF INFORMATION BASED ON MANY REMARKS ON A NETWORK, AND NON-TRANSITORY COMPUTER READABLE STORAGE MEDIUM HAVING STORED THEREON COMPUTER PROGRAM THEREFOR

BACKGROUND OF THE INVENTION

Field of the Invention

The present invention relates to a system for determining credibility of given information and, more specifically, to a technique for determining credibility of information based on remarks of many users on the Internet and on knowledge of causal relations.

Description of the Background Art

Search engines and question-answering systems offered on the Internet have made it possible to efficiently obtain necessary information from huge amount of texts on the Internet. A large amount of information thus obtained, however, may include pieces of information of questionable credibility. It is extremely difficult to verify each of such pieces of information. By way of example, consider a system that offers disaster-related information through question-answering. When a question "What is occurring in Cleveland" is input to this system, a possible answer candidate may be "Rivers are flooding." We do not know, however, if this answer is credible or not.

Estimating credibility of information output from search engines and question-answering systems has been an enormous technical challenge from the early stage of search engines. Typical technique is disclosed in Non-Patent Literature 1 (KUROHASHI et al., "Joho-bunseki system WISDOM—Web no kenzen na rikatsuyou wo mezashite—(Information Analysis System WISDOM—to attain healthy use of Web—), Mar. 31, 2011, National Institute of Information and Communications Technology, Knowledge Processing Group, Information Credibility Project, retrieved on the Internet on Feb. 1, 2016, which considers attributes of an information sender. This approach has a problem that accurate attributes of information senders can be obtained only in very limited situations. Because of this problem, the application of this technique to texts on the Internet has attained very limited effects. Another approach presents very rough attributes of an information sender such as domain information of a site from which the information is issued, and leaves the user to determine its credibility.

Another technique for determining credibility of information is disclosed in Non-Patent Literature 2 (MURAKAMI et al., "Generating Statement Maps for Capturing Supportive and Contrastive Relations between Statements", Information Processing Society of Japan, IPSJ SIG Technical Reports, 2008-NL-186, pp. 55-60, July 2008). This is a technique referred to as "statement maps" (statement maps generating problem). In the statement maps generating problem, for an input piece of information, a piece of similar information and a piece of contradicting information as well as pieces of information as supporting grounds are displayed in a distinguished manner. Then, a human determines, based on the statement maps, whether the input piece of information is credible or not.

A technique similar to the statement maps generating problem is described in Non-Patent Literature 3 (Rob Ennals and Beth Trushkowsky and John Mark Agosta, "Highlighting disputed claims on the web," Proceedings of WWW2010. pp. 341-350, 2010), which is called Dispute Finder. Dispute Finder is provided as an extension of web browsers and has a function of highlighting passages in a web page which the user currently reads if the passage is controversial on the web.

SUMMARY OF THE INVENTION

In any of the techniques disclosed in Non-Patent Literatures 1, 2 and 3, the determination itself of the information credibility is done by the user, and the systems does no more than offering materials for determining credibility. If a system is capable of highly accurate determination of credibility, for example, if a question-answering system emphasizes answer candidates of high credibility and removes those of low credibility, the user can get more meaningful answers. Further, accuracy of credibility determination should be as high as possible. Though techniques proposed so far have succeeded in providing materials for determination, they could not provide any method to determine the credibility of information with a high accuracy.

Therefore, it is preferable to provide a credibility determining system that can determine the credibility of given information with a high accuracy.

According to a first aspect, the present invention provides a computer-implemented credibility determining system, for determining credibility of input information based on a set of remarks on a network. The credibility determining system includes; a network interface connected to the network and a non-transitory computer readable storage medium. The non-transitory computer readable storage medium includes a causal relation storage device for storing pieces of causal relation knowledge. Each piece of causal relation knowledge includes a combination of a cause part consisting of a text representing a cause part and a result part consisting of a text representing a result of the cause, and a time constraint and a position constraint associated with the causal relation. The non-transitory computer readable storage medium further includes a remark text storage device for storing a set of texts of the remarks.

The credibility determining system further includes a processor connected to the network interface and the storage medium. The processor is configured to perform: searching for and retrieving, from the causal relations stored in the causal relation storage device, a causal relation matching the input information, and specifying, for each retrieved causal relation, a constraint condition on retrieval of a remark from the set of texts of the remarks based on a time constraint and a position constraint stored in the causal relation storage device in association with the causal relation; for each retrieved causal relation, retrieving, from the set of texts of the remarks, a remark satisfying the specified constraint condition and representing a cause or a result of an item represented by the input information, using the causal relation knowledge; and classifying each of the retrieved remarks to those remarks representing causes of the item represented by the input information and to those remarks representing results of the item represented by the input information, determining credibility of the input information based on the classification, and outputting the result of determination.

The processor may further be configured to perform repeatedly collecting remarks from the network through the network interface and storing them in the remark text storage device.

Preferably, each of the constraint conditions includes a time constraint condition or a geographical constraint condition to be established between a cause and a result of the causal relation. In order to realize retrieval from the set of texts of the remarks, the processor is configured to perform: estimating a time of occurrence of an item represented by the input information, based on time information obtained from the input information; estimating a position of occurrence of an item represented by the input information based on geographical information obtained from the input information; and extracting, from the set of texts of the remarks, for each retrieved causal relation, a remark representing a cause or a result of an item represented by the input information, which has a content satisfying the time constraint with the time of occurrence estimated for the input information as a point of reference or a content satisfying the position constraint with the position of occurrence estimated for the input information being a point of reference.

Further preferably, in order to extract the remark, the processor is configured to perform: specifying a first causal relation having in the result part thereof the input information or a text equivalent to the input information, from the causal relations stored in the causal relation storage device; and extracting, from the set of texts of the remarks, a remark having a content matching or equivalent to the specified first causal relation and satisfying the time constraint and the position constraint, respectively, associated with the specified first causal relation, with the estimated time and the estimated position being points of references.

Preferably, in order to extract the remark, the processor is further configured to perform: specifying a second causal relation having in the cause part thereof the input information or a text equivalent to the input information, from the causal relations stored in the causal relation storage device; and extracting, from the set of texts of the remarks, a remark having a content matching or equivalent to the result part of the specified second causal relation and satisfying the time constraint and the position constraint, respectively, stored in the causal relation storage device associated with the specified second causal relation, with the estimated time and the estimated position being points of references.

Preferably, the processor is further configured to perform extracting, from the set of texts of the remarks, for each specified first or second causal relation, a remark contradicting a cause or a result of an item represented by the input information and satisfying the time constraint with the time of occurrence estimated for the input information being a point of reference and satisfying the position constraint with the position of occurrence estimated for the input information being a point of reference. In order to perform the determination, the processor is configured to perform: classifying each of the extracted remarks to a first type of remarks representing a cause of the item represented by the input information, to a second type of remarks representing a result of the item represented by the input information, and to a third type of remarks representing contradictions with the item represented by the input information; determining credibility of the input information as a function of the number of remarks classified to the first type, the number of remarks classified to the second type and the number of remarks classified to the third type, by the classification; and outputting the determined credibility. A value of the function changes with positive correlations with respect to the numbers of remarks classified to the first type and to the number of remarks classified to the second type, respectively, and changes with a negative correlation with the number of remarks classified to the third type.

More preferably, in order to perform the determination, the processor is configured to perform: classifying each of the extracted remarks to a first type of remarks representing a cause of the item represented by the input information and a second type of remarks representing results of the item represented by the input information; determining credibility of the input information as a function of the number of remarks classified to the first type and the number of remarks classified to the second type, respectively; and outputting the determined credibility.

More preferably, the function is a monotonically increasing function with reference to each of the number of remarks classified to the first type and the number of remarks classified to the second type.

Preferably, an increment of the value of the function per unit of change of the number of remarks classified to the first type is larger than an increment per unit of change of the number of remarks classified to the second type.

According to a second aspect, the present invention provides a computer-implemented credibility determining method for determining credibility of input information based on a set of texts of remarks on a network. The computer includes a network interface connected to the network, and a non-transitory computer readable storage medium. The non-transitory computer readable storage medium includes a causal relation storage device for storing pieces of causal relation knowledge. Each piece of causal relation knowledge includes a combination of a cause part consisting of a text representing a cause and a result part consisting of a text representing a result of the cause, and a time constraint and position constraint associated with the causal relation. The non-transitory computer readable storage medium further includes a remark text storage device for storing a set of texts of the remarks. The credibility determining method includes the steps of: searching for and retrieving, from the causal relations stored in the causal relation storage device, retrieving a causal relation matching the input information, and for each retrieved causal relation, specifying a constraint condition for retrieving a remark from the set of texts of the remarks based on a time constraint and a position constraint stored in the causal relation storage device in association with the causal relation; for each retrieved causal relation, retrieving, from the set of texts of the remarks, a remark satisfying the specified constraint condition and representing a cause or result of an item represented by the input information, using the causal relation; and classifying each of the retrieved remarks to remarks representing causes of the item represented by the input information or to remarks representing results of the input information, determining credibility of the item represented by the input information based on results of classification, and outputting the result of determination.

Preferably, the method further includes the step of repeatedly collecting remarks from the network through the network interface and storing collected remarks in the remark text storage device.

Each of the constraint condition includes a time constraint condition or a geographical constraint condition to be established between a cause and a result of a causal relation. The step of retrieving from the set of texts of the remarks includes the steps of: estimating a time of occurrence of an item represented by the input information, based on time information obtained from the input information; estimating a position of occurrence of an item represented by the input information based on geographical information obtained from the input information; and extracting, from the set of texts of the remarks, for each retrieved causal relation, a remark representing a cause or a result of an item represented by the input information, which has a content satisfying the time constraint with the time of occurrence estimated for the input information being a point of reference or a content satisfying the position constraint with the position of occurrence estimated for the input information being a point of reference.

The step of extracting a remark includes the steps of: specifying a first causal relation having in the result part thereof the input information or a text equivalent to the input information, from the causal relations stored in the causal relation storage device; and extracting, from the set of texts of the remarks, a remark having a content matching or equivalent to a causal part of the specified first causal relation and satisfying the time constraint and the position constraint, respectively, associated with the specified first causal relation, with the estimated time and the estimated position being points of references.

The step of extracting a remark further includes the steps of: specifying a second causal relation having in the part thereof the input information or a text equivalent to the information, from the causal relations stored in the causal relation storage device; and extracting, from the set of texts of the remarks, a remark having a content matching or equivalent to a result part of the specified second causal relation and satisfying the time constraint and the position constraint, respectively, associated with the specified second causal relation, with the estimated time and the estimated position being points of references.

The credibility determining method further includes the step of extracting, from the set of texts of the remarks, for each specified first or second causal relation, a remark contradicting an item as a cause or a result of an item represented by the input information and satisfying the time constraint with the time of occurrence estimated for the input information being a point of reference and satisfying the position constraint with the position of occurrence estimated for the input information being a point of reference. The determining step includes the steps of: classifying each of the extracted remarks to a first type of remarks representing a cause of the item represented by the input information, a second type of remarks representing a result of the item represented by the input information, or a third type of remarks representing contradictions with the item represented by the input information; determining credibility of the input information as a function of the number of remarks classified to the first type, the number of remarks classified to the second type and the number of remarks classified to the third type, by the classification; and outputting the determined credibility. A value of the function changes with positive correlations with respect to the number of remarks classified to the first type and the number of remarks classified to the second type, and changes with a negative correlation with the number of remarks classified to the third type.

The determining step includes the steps of: classifying each of the extracted remarks to a first type of remarks representing a cause of the item represented by the input information or a second type of remarks representing a result of the item represented by the input information; determining credibility of the input information as a function of the number of remarks classified to the first type and the number of remarks classified to the second type; and outputting the determined credibility.

This function may be a monotonically increasing function with reference to each of the number of remarks classified to the first type and the number of remarks classified to the second type.

Preferably, an increment of the value of the function per unit of change of the number of remarks classified to the first type is larger than an increment per unit of change of the number of remarks classified to the second type.

According to a third aspect, the present invention provides a non-transitory computer-readable storage medium having stored thereon a computer program for controlling a computer such that, based on a set of remarks on a network, the computer determines credibility of input information. The computer includes a network interface connected to the network, and a non-transitory computer readable storage medium. The non-transitory computer readable storage medium includes a causal relation storage device for storing pieces of causal relation knowledge. Each piece of causal relation knowledge includes a combination of a cause part consisting of a text representing a cause and a result part consisting of a text representing a result of the cause, and a time constraint and a position constraint associated with the causal relation. The non-transitory computer readable storage medium further includes a remark text storage device for storing a set of texts of the remarks. The computer program is configured to cause the computer to perform the steps of: searching for and retrieving, from the causal relations stored in the causal relation storage device, a causal relation matching the input information, and for each retrieved causal relation, specifying a constraint condition for retrieving a remark from the set of texts of the remarks based on a time constraint and a position constraint stored in the causal relation storage device in association with the causal relation; for each retrieved causal relation, retrieving, from the set of texts of the remarks, a remark satisfying the specified constraint condition and representing a cause or a result of an item represented by the input information, using the causal relation knowledge; and classifying each of the retrieved remarks to those remarks representing causes of the item represented by the input information or remarks representing results of the item represented by the input information, determining credibility of the input information based on results of classification, and outputting the result of determination from the computer.

Preferably, each of the constraint conditions includes a time constraint condition or a geographical constraint condition to be established between a cause and a result of the causal relation. The step of retrieving includes the steps of: estimating a time of occurrence of an item represented by the input information, based on time information obtained from the input information; estimating a position of occurrence of an item represented by the input information based on geographical information obtained from the input information; and extracting, from the set of texts of the remarks, for each retrieved causal relation, a remark representing a cause or a result of an item represented by the input information, which has a content satisfying the time constraint with the time of occurrence estimated for the input information being a point of reference or a content satisfying the position constraint with the position of occurrence estimated for the input information being a point of reference.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows an input screen of a disaster information analyzing system for SNS in accordance with a first embodiment of the present invention.

FIG. 3 shows a state of the input screen in which answer candidates to a question are displayed in the form of a list, in screen of the disaster information analyzing system for SNS in accordance with the first embodiment of the present invention.

FIG. 10 is a block diagram showing configurations of a text searching unit and a search result storage unit of the system shown in FIG. 4.

FIG. 12 is a schematic illustration showing difference between determining credibility of a result from a cause and credibility of a cause from a result.

DETAILED DESCRIPTION OF THE PREFERRED EMBODIMENTS

Figure 2:
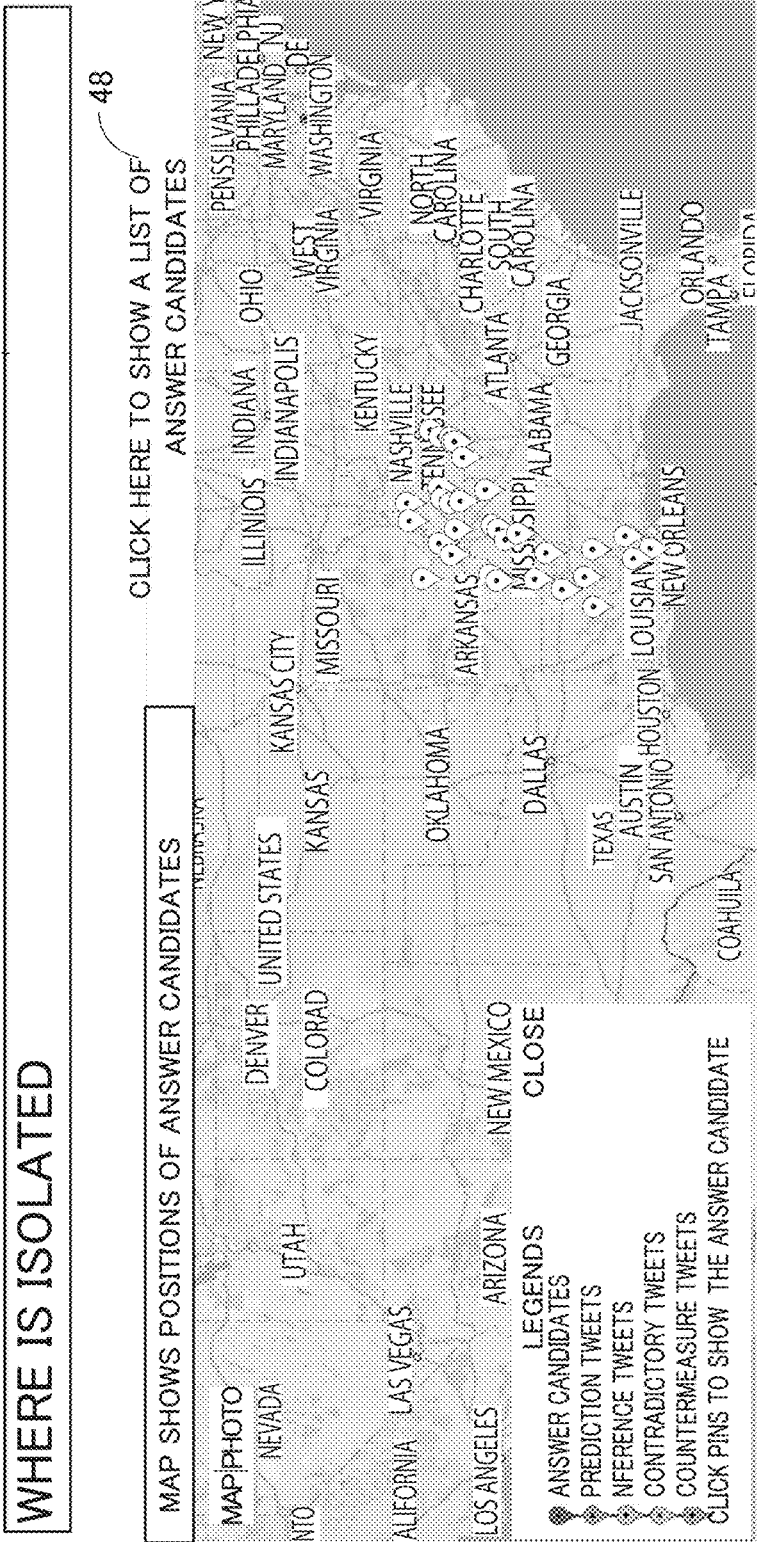
FIG. 2 shows a state of the input screen in which answer candidates to a question are displayed on a map, in the disaster information analyzing system for SNS in accordance with a first embodiment of the present invention.

In the following description and in the drawings, the same components are denoted by the same reference characters. Therefore, detailed description thereof will not be repeated.
[Configuration]

FIG. 1 shows a question input screen 40 of the disaster information analyzing system for SNS in accordance with a first embodiment of the present invention. Question input screen 40 includes a question input field 42, a display area 44 for displaying a list of answer candidates to the question, a tab 46 for switching the display of display area 44 displaying a list of answer candidates to a display of a map, and a tab 48 for switching the display to the list form.

FIG. 2 shows a state of the display area 44 of the list of the answer candidates when a question "Where are the isolated places?" is input to the system, in which a list of answer candidates is switched to a list on a map on display area 44, and FIG. 3 shows a state in which the display is switched to the form of a list. As can be seen from FIG. 2, in the present embodiment, from remarks on a mini-blog such as twitter, those considered to be apt as answers to the question are retrieved and their origins are shown by the so-called "pins" on the map. On this display, the color, size, shape, movement of each pin or combinations of these may be changed based on the credibility of the answer candidate. In the form shown in FIG. 3, answer candidates obtained from remarks on mini-blogs are displayed. In this case also, it is possible to change the manner of display of each answer candidate based on the credibility of each answer candidate.

Figure 4:
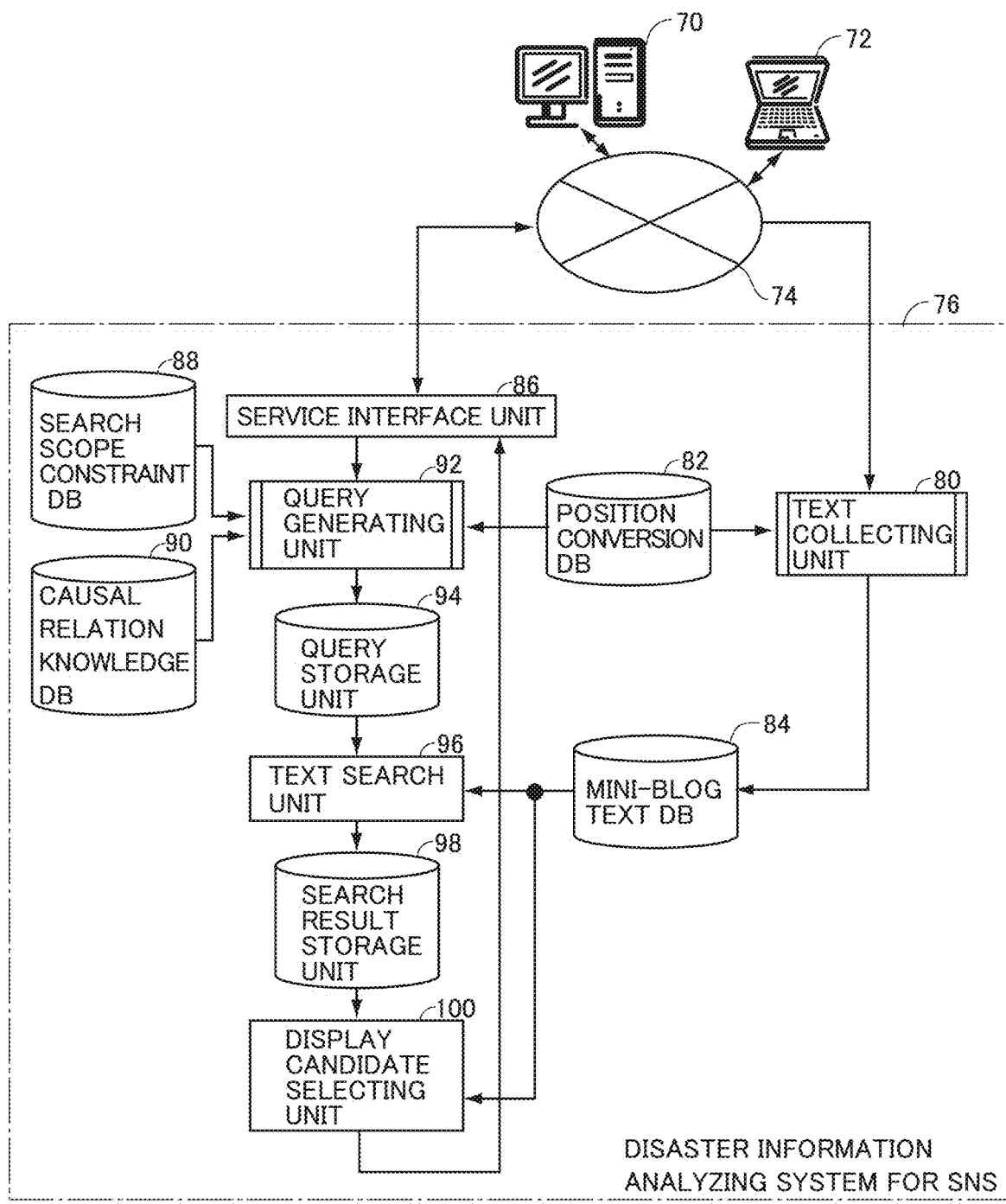
FIG. 4 is a schematic block diagram showing a configuration of the disaster information analyzing system for SNS in accordance with the first embodiment of the present invention.

Referring to FIG. 4, a disaster information analyzing system for SNS 76 in accordance with the present embodiment is capable of communicating, through the Internet 74, with a personal computer (PC) 72 of a user, with a mini-blog server 70 maintaining and managing a set of users' remarks and so on. Disaster information analyzing system for SNS 76 includes: a text collecting unit 80 that periodically downloads, for example, from a mini-blog server 70 through the Internet 74, a set of mini blog users' remarks, and if a place-name is mentioned in texts, adds thereto positional information consisting of latitude and longitude; a position conversion database (DB) 82 storing information of correspondence between place-names and pieces of positional information, used by the text collecting unit 80 when it adds the positional information based on the place-name; and a mini-blog text DB 84 storing the texts collected by text collecting unit 80.

Disaster information analyzing system for SNS 76 further includes: a service interface unit 86 for providing disaster analysis information for SNS using screens such as shown in FIGS. 1 to 3 by interaction with the users through the Internet 74; a causal relation knowledge DB 90 for storing many pieces of causal relation knowledge; a search scope constraint DB 88 for storing constraint information used for defining constraint conditions for retrieving related remarks based on a causal relation, for each piece of causal relation knowledge; a query generating unit 92 for generating a query for searching remarks as answer candidates from mini-blog text DB 84, based on information or question received at service interface unit 86 from a PC 72 of a user; and a query storage unit 94 for storing a query generated by query generating unit 92.

Disaster information analyzing system for SNS 76 further includes: a text search unit 96 searching mini-blog text DB 84 using each query stored in query storage unit 94 and outputting results of search; a search result storage unit 98 for storing results of search by text search unit 96; and a display candidate selecting unit 100 determining credibility of the information or question first received by service interface unit 86 and credibility of each remark included in the results of search stored in search result storage unit 98, also using text in mini-blog text DB 84, selecting remarks with high credibility and displaying them on PC 72 of the user through service interface unit 86.

Figure 5:
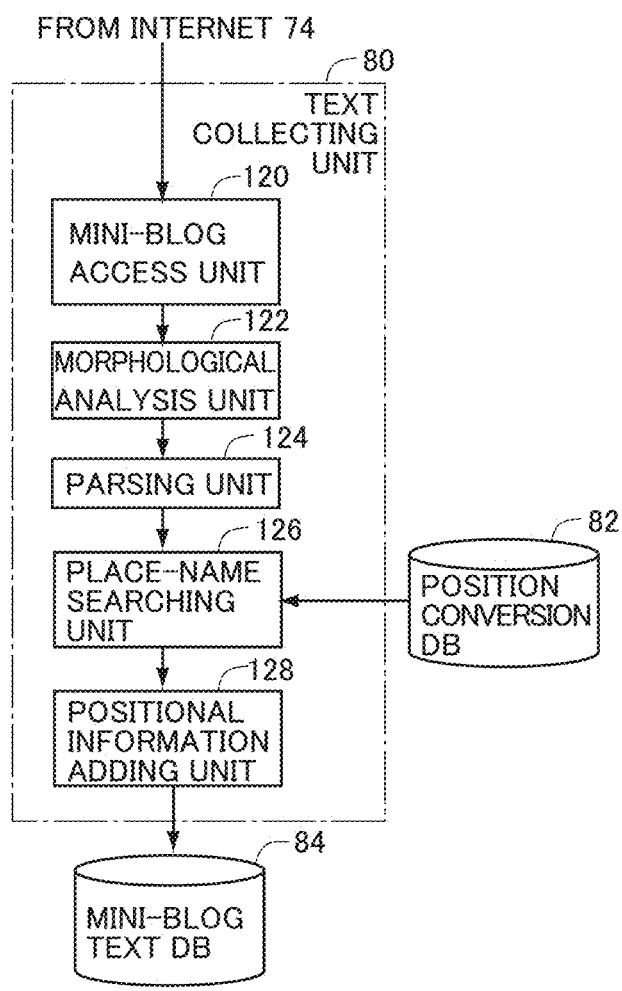
FIG. 5 is a block diagram showing a configuration of a text collecting unit of the system shown in FIG. 4.

Referring to FIG. 5, text collecting unit 80 shown in FIG. 4 includes: a mini-blog access unit 120 periodically accessing mini-blog server 70 through the Internet 74 and transferring users' remarks added after the last access from mini-blog server 70; a morphological analysis unit 122 performing morphological analysis of mini-blog texts transferred by mini-blog access unit 120; a parsing unit 124 performing parsing of texts using the results of morphological analysis; a place-name searching unit 126 searching for positional information of latitude and longitude using position conversion DB 82 when a parsed text contains a place-name; and a positional information adding unit 128 adding to the text the searched positional information.

Figure 6:
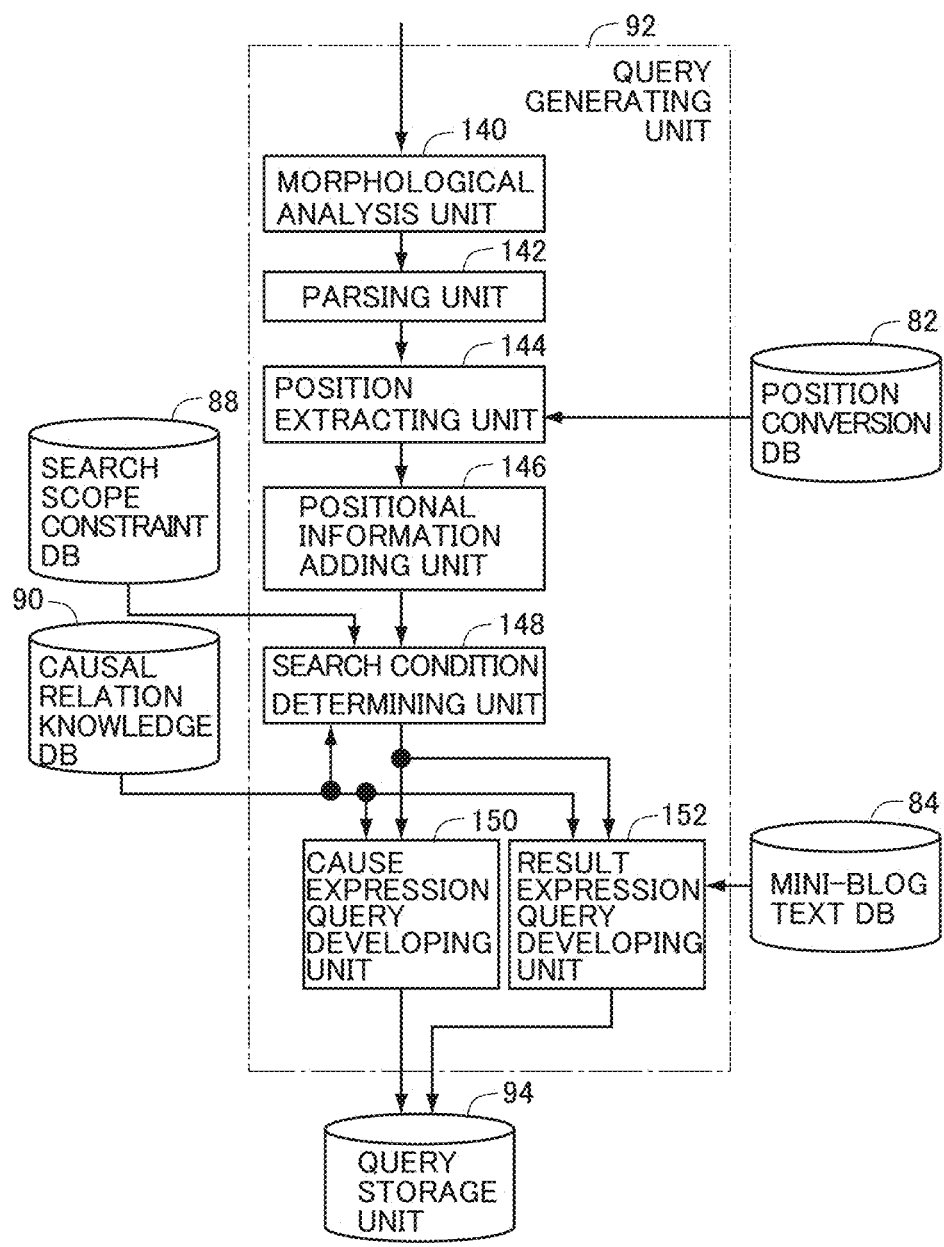
FIG. 6 is a block diagram showing a configuration of a query generating unit of the system shown in FIG. 4.

Referring to FIG. 6, query generating unit 92 includes: a morphological analysis unit 140 performing morphological analysis of a text such as a question sentence input by a user; a parsing unit 142 performing parsing of the text after morphological analysis; a position extracting unit 144 retrieving, when a place-name is contained in the result of parsing, positional information corresponding to the place-name from position conversion DB 82; positional information adding unit 146 for adding the positional information retrieved by position extracting unit 144 to the text; a search condition determining unit 148 for determining search condition for searching for remarks having causal relation with the input text from mini-blog text DB 84, based on the input text, using the causal relation knowledge stored in causal relation knowledge DB 90 and using position and time constraints on searching for related remarks associated with the causal relation knowledge stored in search scope constraint DB 88; a cause expression query developing unit 150 using the search condition determined by search condition determining unit 148, for developing and outputting a query that retrieves, from mini-blog text DB 84, remarks including expressions (cause expressions) as a cause of the input text; and a result expression query developing unit 152, using the search condition determined by search condition determining unit 148, for developing and outputting a query that searches, from mini-blog text DB 84, remarks including expressions (result expressions) as a result of the input text. Result expression query developing unit 152 has its output connected to query storage unit 94, and each query output from result expression query developing unit 152 is stored in query storage unit 94.

Here, the constraint information related to the search scope stored in search scope constraint DB 88 is described. When credibility of a certain piece of information is to be determined, what clues are to be used? It may be helpful to retrieve pieces of information having causal relation with the certain piece of information and posted temporally and geographically close to the certain piece of information. If we can find a large number of pieces of such information, the certain piece of information would be determined to have high credibility and, if not, it has low credibility.

By way of example, assume that a piece of information "Rivers are flooding in Memphis now" is posted on Nov. 15, 2015, and its credibility is to be determined on Nov. 15, 2015. A remark "Mississippi River flooded in 1927" is close in position but remote in time. Therefore, this remark cannot be used as a ground for determining credibility of the information of interest. Another remark "We had heavy rain last month" is not so old as 1927, but still too far in determining the credibility of the remark "Rivers are flooding in Memphis now." On the other hand, if remarks "Heavy rain continues from 14th" and "We still have heavy rain today" are found to be posted on Nov. 15, 2015 and if these are from places near Memphis, these confirm the first remark and, hence, these can be the grounds for evaluating high credibility of the first remark.

Likewise, when credibility of information "I have infected by a dengue fever after returning from country X" posted on Nov. 15, 2015 is to be determined, a remark "Deng fever was prevalent in 1780," is too remote in time and it cannot be the ground for supporting credibility. By contrast, remarks such as "Deng fever is spreading since last month" "Deng fever is spreading in country X" confirm the first information and these can be the grounds for evaluating high credibility of the first remark, if these are posted close in time.

Figure 7:
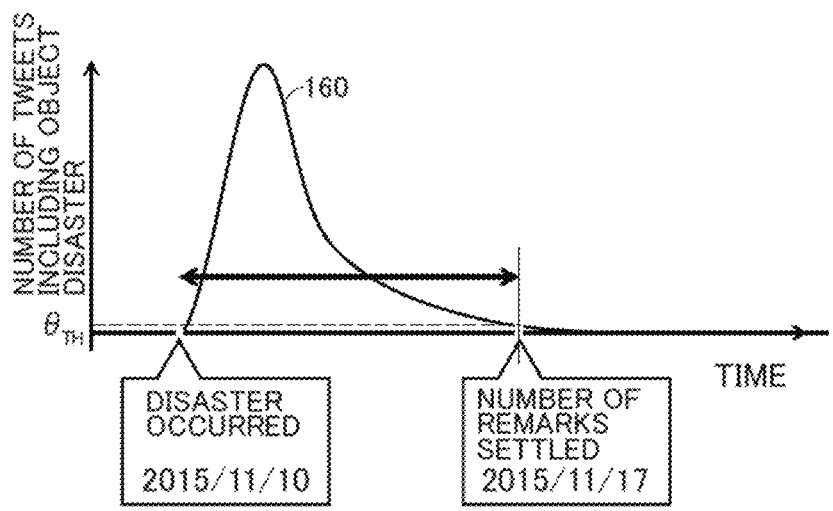
FIG. 7 is a graph showing an example of a method of specifying a period of searching remarks (tweets) to be retrieved.

Referring to FIG. 7, assume that a disaster occurred around Nov. 10, 2015. Past examples show that the number of tweets related to a disaster rapidly increases (i.e., bursts), reaches its peak in one or two days, and then decreases and goes back to normal in about a week (curve 160 of FIG. 7). If we determine, for example, a threshold value $\Theta_{TH}$ at which the ratio to the peak attains a prescribed value, we can determine that the burst has settled when the number of tweets becomes lower than the threshold value. From such past examples, it can be seen that pieces of information close in time to the input information must be adopted.

The threshold value for determining whether it is sufficiently close in time or not depends on the type of the event expressed by the information as the object of determination as well as on the magnitude of the event. For instance, in case of an epidemic or a large-scale disaster, pieces of information generated approximately one week before are relevant (about one month before a larger-scale disaster), while in case of a smaller-scale disaster or to weather, pieces of information generated in one or two days before are relevant. The threshold value for determining whether or not it is sufficiently close in position also depends on the event stated by the information as the object of determination. In case of an epidemic or a large-scale disaster, information from afar may be relevant, while in case of a smaller-scale disaster or to weather, information of the neighborhood would be relevant but information from afar may be unrelated. The constraint conditions of the time and positional scopes to be determined sufficiently close are classified and prepared in the form of database in advance, for various events as the objects of determination, based on past similar examples. Such information is stored in search scope constraint DB 88. In the present embodiment, for the purpose of easy implementation, each causal relation stored in causal relation knowledge DB 90 has its class determined, and for each class, the constraint conditions are formed in advance and stored in search scope constraint DB 88.

In the example shown in FIG. 7, it may be appropriate to set one week as the time of sufficient closeness. For a smaller-scale disaster, the number of tweets would have such a curve in a shorter time period, and for a larger-scale disaster, it will have such a curve over a longer time period. In any case, depending on the type and scale of a disaster, remarks related to the disaster are made in different time spans and, therefore, it is necessary to carefully determine the time scope when related remarks are to be searched.

Table 1 shows examples of constraint conditions stored in search scope constraint DB 88. In Table 1, positional constraints are expressed as country, state and nationwide and so forth. For convenience of implementation, actually, it is easier to collect remarks issued within a circle with the specific point being the center.

TABLE 1

| Class | Positional Restriction | Time Restriction |
|---|---|---|
| Earthquake (magnitude 6+) | Neighboring County, State | 1 month |
| Earthquake (magnitude 6−) | Neighboring County, State | 3 days |
| Typhoon | State | 3 days |
| Air-borne infection | Nation wide | 6 months |
| Contact-only infection | Neighboring County, State | 2 months |

Figure 8:
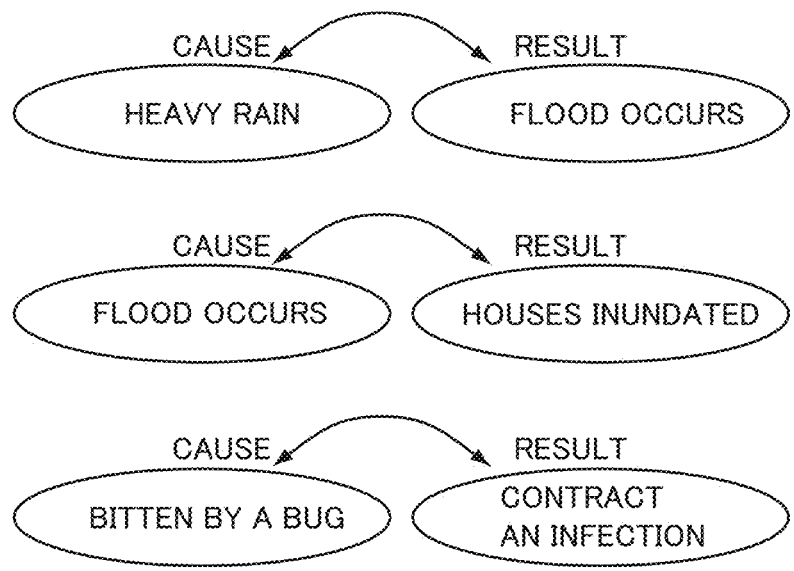
FIG. 8 schematically shows relations between pieces of information represented by knowledge of causal relations.

In the present embodiment, causal relation knowledge consists of a pair of sentences that are cause and result respectively. For example, referring to FIG. 8, in the case of "heavy rain" and "flood occurs," the former is the cause of the latter, and the latter is the result of the former. Such a relation is referred to as causal relation and the pair of these sentences is referred to as causal relation knowledge. In the examples shown in FIG. 8, "flood occurs" and "houses inundated", and "bitten by a bug" and "contract an infection" are also stored as pieces of causal relation knowledge.

Figure 9:
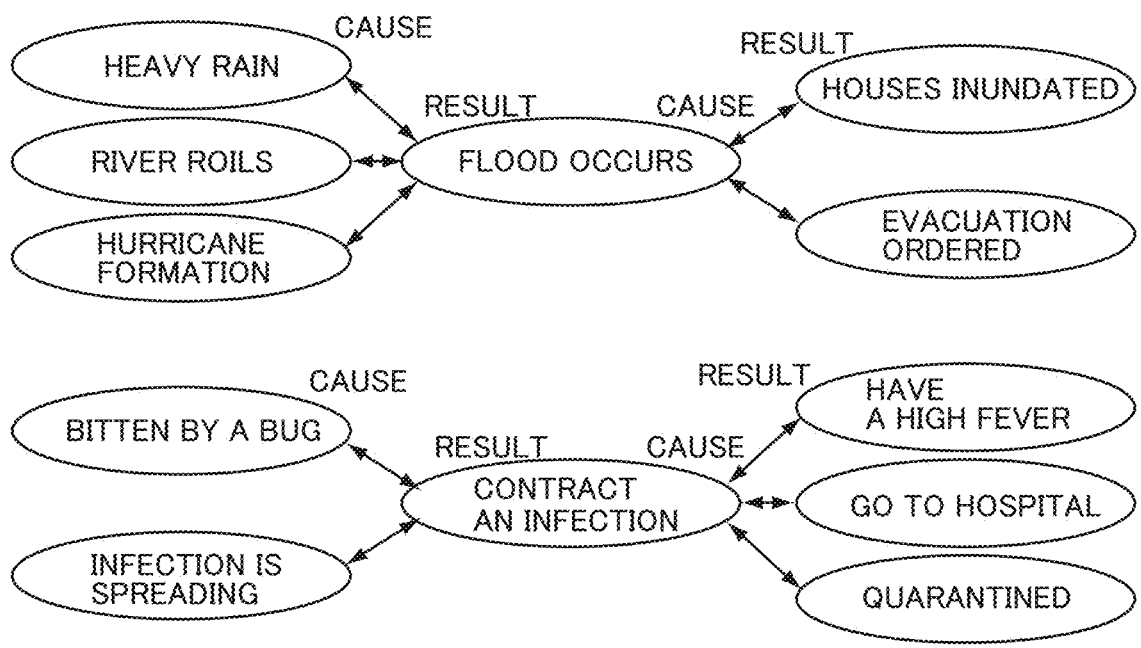
FIG. 9 schematically shows relations between pieces of information represented by knowledge of causal relations.

From such causal relation knowledge, it can be seen, for example, from the upper part of FIG. 9 that not only "heavy rain" but also "river roils" and "hurricane formation" are causes of "flood occurs" and "flood occurs" is a result of "heavy rain," "river roils" and "hurricane formation." Further, it can be seen that "flood occurs" is a cause of "houses inundated" and "evacuation ordered", and "house inundated" and "evacuation ordered" are results of "flood occurs."

Another example is shown in the lower part of FIG. 9, in which "infection is spreading" and "bitten by a bug" are causes of "contract an infection" and the latter is the result of the former. Further, "contract an infection" is a cause of "have a high fever," "go to hospital" and "quarantined" and the latter three remarks are all results of "contract an infection."

By combining the causal relation knowledge as such with the constraint condition, the accuracy of determining information credibility can further be improved. First, each piece of causal relation knowledge is allocated beforehand to one of the classes of which examples are shown in Table 1. By searching for causal relation knowledge having in a cause part or result part a sentence matching the information as the object of determination, it is possible to know the causal relation matching the information, and hence, the class to which the information belongs. As a result, it becomes clear what positional scope and temporal scope remarks to be retrieved should have for determining the credibility of information.

Here, the causal relation knowledge matches the input information when causal relation knowledge has the same expression as, or an expression equivalent to the input information in the result part or cause part. For example, assume that a piece of information "flood occurred" is input, and there is a causal relation knowledge that "(cause part) heavy rain"→(result part) flood occurs." This causal relation knowledge is an object of extraction, and the expression "heavy rain" can be taken out from the cause part. Then, we can search to see whether remarks including "heavy rain" or equivalent expression can be found under the temporally and geographically close conditions, and based on the results, the credibility of original information "flood occurred" can be determined.

By applying causal relation knowledge, it becomes possible to more appropriately determine the time scope of remarks to be searched. Generally, in causal relation, a cause occurs prior to the result. Therefore, when a causal relation having a result part matching the information as the object of determination is found, accuracy of determining the credibility of the information can be improved by collecting remarks issued in a certain time period prior to the time when the information as the object of determination was issued. On the contrary, when a causal relation having a cause part matching the information as the object of determination is found, the credibility of the information can be assured to some extent by collecting remarks issued in a certain time period after the time when the information as the object of determination was issued. This is also effective to improve accuracy of determining the credibility of the information.

It is very rare that the expression of a cause part or a result part of causal relation knowledge exactly matches the input information. Therefore, when applicable causal relation is to be searched for, it is necessary to use paraphrases, entailments and the like of the input information and the expressions of cause or result part of the causal relation knowledge, to look for matching in as wide a scope as possible of the causal relation knowledge.

Referring to FIG. 10, text search unit 96 includes: a query reading unit 192 for sequentially reading queries stored in query storage unit 94; and a query executing unit 194 connected to receive a query read by query reading unit 192, for executing the query and obtaining results of searching of remarks corresponding to the query from mini-blog text DB 84.

Search result storage unit 98 includes: a search result resource storage unit 202 for storing resources (an array of retrieved remarks) of the results of search by query executing unit 194; and a query type storage unit 200 for storing the types of queries (whether it is a search of a cause expression or a result expression) executed by query executing unit 194.

Figure 11:
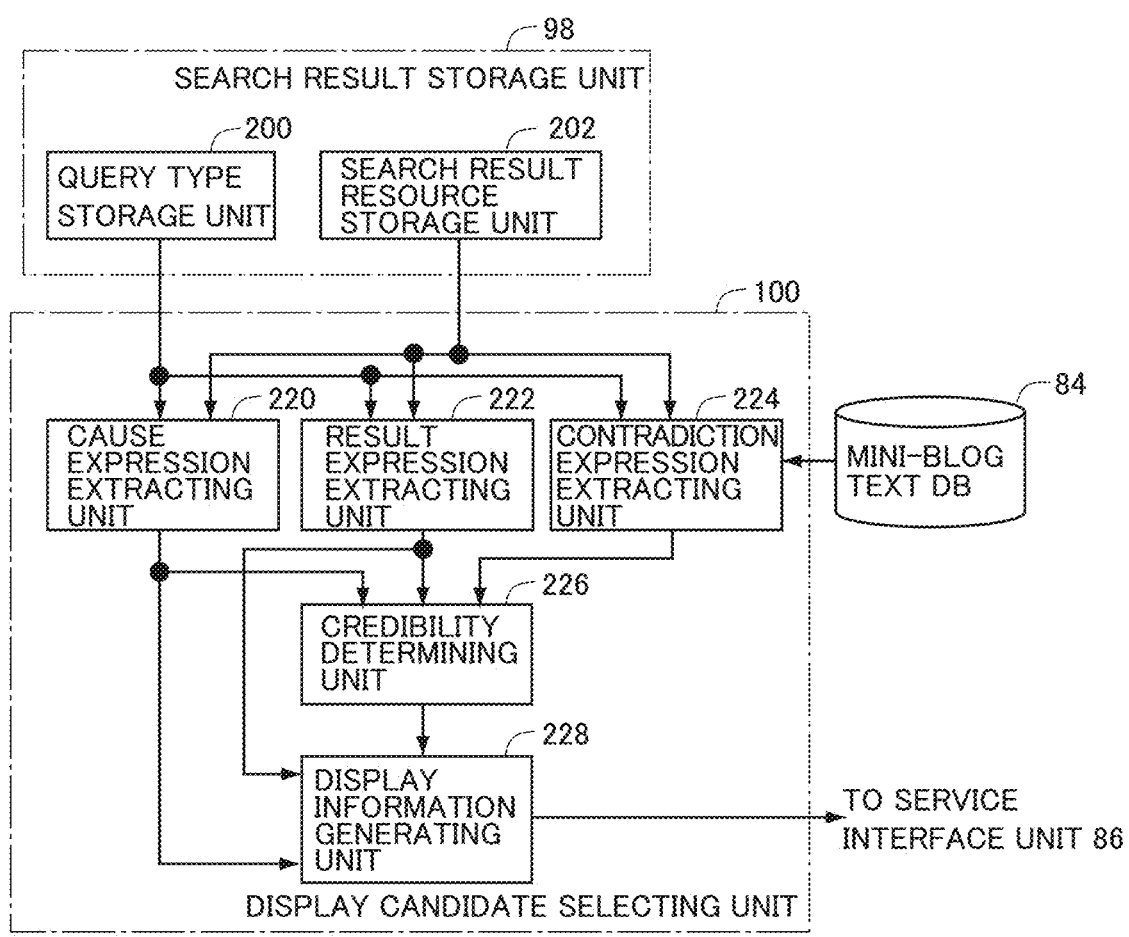
FIG. 11 is a block diagram showing a configuration of a display candidate selecting unit of the system shown in FIG. 4.

Referring to FIG. 11, display candidate selecting unit 100 includes: a cause expression extracting unit 220 reading, from search result resource storage unit 202, the number of expressions (cause expressions) each being a cause of the information as the object of determination, with reference to query type storage unit 200; a result expression extracting unit 222 reading, from search result resource storage unit 202, the number of expressions (result expressions) each being a result of the information as the object of determination, with reference to query type storage unit 200; a contradiction expression extracting unit 224 extracting the number of expressions contradictory to the information as the object of determination; a credibility determining unit 226 trained by machine learning in advance to receive features including the total number of all remarks within a prescribed time period, the number of cause expressions, the number of result expressions and the number of contradiction expressions within the total number, and to output a credibility index; and a display information generating unit 228, responsive to a determination by credibility determining unit 226 that the information as the object has high credibility, for determining that the cause expressions extracted by cause expression extracting unit 220 also have high credibility, and instructing service interface unit 86 to express them in a specific manner of expression such as highlighting. Here, the constraint on the scope of search such as the "prescribed time period" is determined by constraint information stored in search scope constraint DB 88.

When we can find cause expressions only or result expressions only with respect to the information as the object of determination, the credibility of the information is considered higher in the former case. Referring to FIG. 12, assume that the information as the object of determination is "power outage occurs." Further assume that expressions related to occurrence of earthquake are found as cause expressions. Here, it is highly likely that power outage occurs after an earthquake. Therefore, if there are a large number of remarks related to occurrence of an earthquake, the credibility of the information as the object of determination also becomes higher. Meanwhile, assume that "earthquake occurs" is given as the information as the object of determination. Further, assume that "power outage occurs" as the result expression is found. In this case, there may be various causes of power outage other than the earthquake. Therefore, this simple remark cannot be the ground to assume high credibility of the occurrence of earthquake. Generally, for any information as the object of determination, if cause and result expressions are both found, the credibility is the highest, if cause expressions only are found, the credibility is the second highest, and if result expressions only are found, the credibility is low. If none of these can be found, the credibility is quite questionable.

Credibility determining unit 226 is realized by machine learning using the features mentioned above, using a large number of examples in advance.

[Operation]

Disaster information analyzing system for SNS 76 (FIG. 4) described above operates in the following manner. Text collecting unit 80 periodically collects remarks of a mini-blog from, for example, mini-blog server 70 on the Internet 74, and stores them in mini-blog text DB 84.

Referring to FIG. 5, at this time, mini-blog access unit 120 of text collecting unit 80 periodically accesses the mini-blog and transfers remark texts from the server. Morphological analysis unit 122 performs morphological analysis of sentences included in each of the transferred remarks, and then parsing unit 124 performs parsing. When an output from parsing unit 124 includes a place-name and if it indicates the position where the remark is made, place-name searching unit 126 looks up corresponding positional information (latitude and longitude) from position conversion DB 82. Positional information adding unit 128 adds the positional information to the remark and inserts the remark to mini-blog text DB 84.

Text collecting unit 80 repeats this process periodically (for example, every ten minutes).

Referring to FIG. 6, assume that a user inputs a piece of information as an object of credibility determination. Morphological analysis unit 140 of query generating unit 92 performs morphological analysis of the input information, and based on the result, parsing unit 142 performs parsing of the input information. If the result of parsing by parsing unit 142 includes a place-name and the place-name indicates the position where the remark is made, position extracting unit 144 looks up the latitude and longitude information corresponding to the place-name from position conversion DB 82. Positional information adding unit 146 adds the positional information thus taken out to the input information, and applies it to search condition determining unit 148.

Search condition determining unit 148 searches causal relation knowledge DB 90 for every causal relation having the input information in the cause part or result part (causal relation matching the input information). At this time, search condition determining unit 148 extracts causal relations matching the input information as much as possible, using not only the input information itself but also its entailments and paraphrases. Search condition determining unit 148 also reads position/time constraint conditions saved in search scope constraint DB 88 in association with each extracted causal relation.

Cause expression query developing unit 150 applies the time condition or position condition obtained from information input to the constraint condition stored in search scope constraint DB 88, and thereby forms queries for searching for a cause expression corresponding to the input information, and stores all the queries in query storage unit 94. Here, a cause expression is to be found and, therefore, the time scope of searching is limited to those remarks made in a prescribed time period prior to the input information. Similarly, result expression query developing unit 152 applies the time condition or position condition obtained from information input to the constraint condition stored in search scope constraint DB 88, and thereby forms queries for searching a result expression corresponding to the input information, and stores all the queries in query storage unit 94. Different from the cause expression, the query condition limits the remarks to those made in a prescribed time period after the input information.

Referring to FIG. 10, query reading unit 192 reads queries one by one from query storage unit 94 and applies them to query executing unit 194. Query executing unit 194 executes each given query, retrieves remarks matching the query from mini-blog text DB 84, and stores them as resources of query execution result in search result resource storage unit 202. Here, the resource refers to an array representing a set of texts and properties of the remarks obtained as a result of the query. Query executing unit 194 writes information indicating query type (whether it is a search for a cause expression or result expression) in association with the query resource, in query type storage unit 200.

When query reading unit 192 reads all the queries stored in query storage unit 94, and query executing unit 194 executes searching with every query and all results are stored in search result resource storage unit 202, the process by text search unit 96 ends.

Referring to FIG. 11, cause expression extracting unit 220 extracts the number of all cause expressions from search result resource storage unit 202 and applies it to credibility determining unit 226. Similarly, result expression extracting unit 222 extracts the number of all result expressions from search result resource storage unit 202 and applies it to credibility determining unit 226. Contradiction expression extracting unit 224 searches, using contradiction knowledge, for negative modality and the like, for expressions contradictory to the cause expressions or result expressions to see how many of them are stored in search result resource storage unit 202 exist in mini-blog text DB 84, and applies the number to credibility determining unit 226. When the contradiction expression extracting unit 224 searches for such expressions, it operates under the same constraints condition as applied to searching corresponding cause or result expressions.

It is noted that information contradictory to the event as the object of credibility determination can be presented using the statement maps problem described in Non-Patent Literature 2.

Credibility determining unit 226 generates prescribed feature vectors using the total of number of queries, the total numbers of expressions, cause expressions, result expressions and contradiction expressions contradictory to any of the causes or results, for each query, and determines the credibility by the credibility determiner that has been trained by machine learning. The result of credibility determination is output as a numerical value from 0 (no credibility) to 1 (high credibility) in the present embodiment. The result of machine learning approximates a function having positive correlations with the number of cause expressions and the number of result expressions, and having a negative correlation with the number of contradiction expressions. Here, not a simple number but a ratio with respect to the total number of expressions may be used.

When the output of credibility determining unit 226 is higher than a certain threshold value, display information generating unit 228 determines that not only the input information but also the cause expressions extracted by cause expression extracting unit 220 have high credibility, and applies information to that effect to service interface unit 86. Using this information, service interface unit 86 displays those marked as having high credibility among a list of answer candidates in a different manner.

[Computer Implementation]

Figure 13:
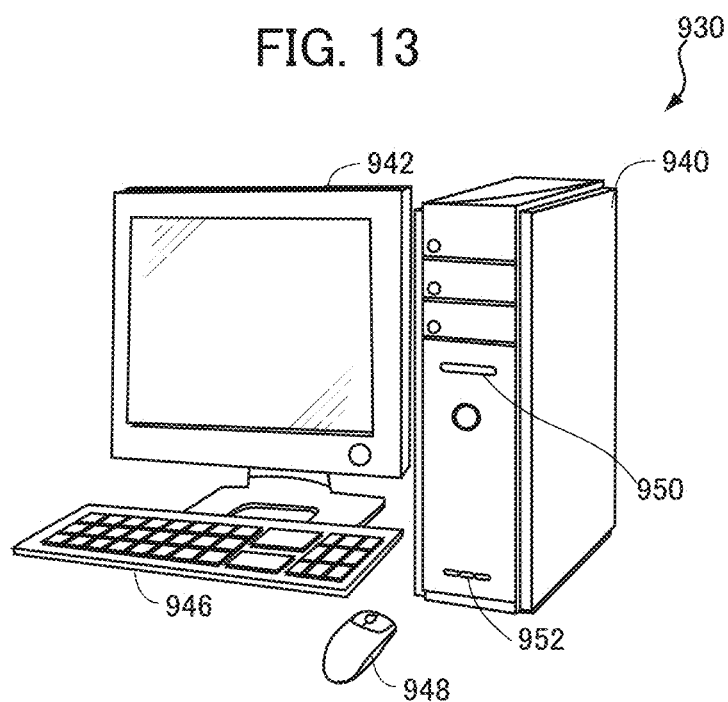
FIG. 13 shows an appearance of a computer system implementing the system shown in FIG. 4.

The system in accordance with the embodiments above can be implemented by computer hardware and computer programs executed on the computer hardware. FIG. 13 shows an appearance of a computer system 930 and FIG. 14 shows an internal configuration of computer system 930.

Referring to FIG. 13, computer system 930 includes a computer 940 having a memory port 952 and a DVD (Digital Versatile Disk) drive 950, a keyboard 946, a mouse 948, and a monitor 942.

Figure 14:
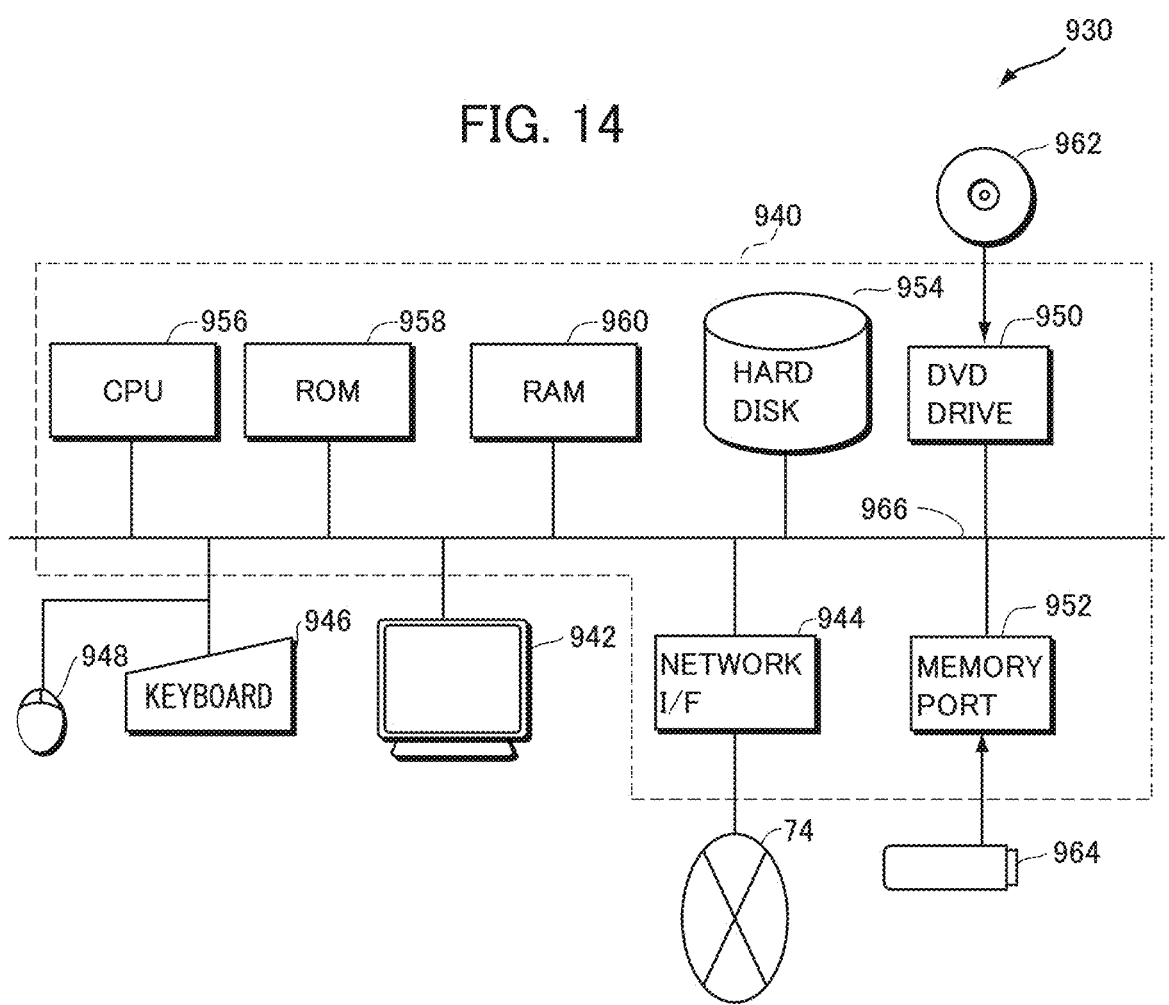
FIG. 14 is a block diagram showing an internal configuration of the computer system shown in FIG. 13.

Referring to FIG. 14, computer 940 includes, in addition to memory port 952 and DVD drive 950, a CPU (Central Processing Unit) 956, a bus 966 connected to CPU 956, memory port 952 and DVD drive 950, a read only memory (ROM) 958 storing a boot-up program and the like, and a random access memory (RAM) 960 connected to bus 966, storing program instructions, a system program and work data. Computer system 930 further includes a network interface (I/F) 944 providing the connection to a network allowing communication with another terminal. Network I/F 944 may be connected to the Internet 74.

The computer program causing computer system 930 to function as each of the functioning sections of the system in accordance with the embodiment above is stored in a DVD 962 or a removable memory 964 loaded to DVD drive 950 or to memory port 952, and transferred to hard disk 954. Alternatively, the program may be transmitted to computer 940 through a network, not shown, and stored in hard disk 954. At the time of execution, the program is loaded to RAM 960. The program may be directly loaded from DVD 962, removable memory 964 or through network to RAM 960.

The program includes a plurality of instructions to cause computer 940 to operate as functioning sections of the system in accordance with the embodiment above. Some of the basic functions necessary to realize the operation are provided by the operating system (OS) running on computer 940, by a third party program, or by a module of various programming tool kits installed in computer 940. Therefore, the program may not necessarily include all of the functions necessary to realize the system and method of the present embodiment. The program has only to include instructions to realize the functions of the above-described system by calling appropriate functions or appropriate program tools in a program tool kit in a manner controlled to attain desired results. The operation of computer system 930 is well known and, therefore, description thereof will not be given here.

Effects of the Embodiment

As described above, according to the present embodiment, in connection with the credibility of input information, users' remarks posted close in time and position to the post of the input information having causal relation established with the input information are searched for in mini-blogs. The obtained remarks are classified to expressions interpreted as causes to the input information and expressions interpreted as results of the input information, and the credibility is determined based on the results. Further, expressions contradictory to the cause expressions or result expressions are also used for credibility determination.

[Modifications]

In the embodiment above, the object is a mini-blog. The present invention, however, is not limited to such an embodiment. The object may be so-called SNS in general, or Web pages in general.

Further, in the embodiment above, when expressions contradictory to the cause expressions or result expressions are found, the credibility of original information is made lower. Such a process, however, is optional. Further, if the input information has high credibility, the retrieved corresponding expressions are also determined to have high credibility in the example above. The present invention is, however, not limited to such an embodiment. For example, the result expressions may also be determined to have high credibility. Further, though machine-trained determiner is used for the credibility determination in the embodiment above, it is not limiting. As described above, the value of credibility differs depending on the combination of presence/absence of cause expression and presence/absence of result expression. Therefore, the relations therebetween may be expressed in regression equation, and the result thereof may be output. Alternatively, as the credibility determination, it may simply be indicated by four stages, that is, both cause and result expressions exist, only cause expressions exist, only result expressions exist, and neither of these exists. In this case also, it is preferred that the credibility is made higher if the number of retrieved results is larger.

Further, credibility determining unit 226 may be realized by manually prepared rule descriptions in advance. The same applies to those in the embodiment above which can be realized by machine learning.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A computer-implemented credibility determining system, for determining credibility of input information based on a set of remarks on a network, the credibility determining system comprising:
a network interface connected to the network; and
a non-transitory computer readable storage medium; wherein the non-transitory computer readable storage medium includes:
a causal relation storage device for storing pieces of causal relation knowledge, each piece of the causal relation knowledge including:
a combination of a cause part consisting of a text representing a cause and a result part consisting of a text representing a result of the cause, and
a time constraint and a position constraint associated with the causal relation;
the non-transitory computer readable storage medium further includes a remark text storage device for storing a set of texts of the remarks;
the credibility determining system further comprising a processor connected to the network interface and the storage medium, wherein:
the processor is configured to perform:
searching for and retrieving, from the causal relations stored in the causal relation storage device, a causal relation matching the input information;
specifying, for each retrieved causal relation, a constraint condition on retrieval of a remark from the set of texts of the remarks based on a time constraint and a position constraint stored in the causal relation storage device in association with the causal relation;
for each retrieved causal relation, retrieving, from the set of texts of the remarks, a remark satisfying the specified constraint condition and representing a cause or a result of an item represented by the input information, using the causal relation knowledge;

classifying each of the retrieved remarks to those remarks representing causes of the item represented by the input information and to those remarks representing results of the item represented by the input information, determining credibility of the input information based on the classification, and outputting the result of determination; and extracting, from the set of texts of the remarks, for each retrieved causal relation, a remark representing a cause or a result of an item represented by the input information, which has a content satisfying the time constraint with the time of occurrence estimated for the input information being a point of reference or a content satisfying the position constraint with the position of occurrence estimated for the input information being a point of reference, wherein in order to extract the remark, the processor is configured to perform:

specifying a first causal relation having in the result part thereof the input information or a text equivalent to the input information, from the causal relations stored in the causal relation storage device, and extracting, from the set of texts of the remarks, a remark having a content matching or equivalent to the specified first causal relation and satisfying the time constraint and the position constraint, respectively, associated with the specified first causal relation, with the estimated time and the estimated position being points of references.

2. The credibility determining system according to claim 1, wherein the processor is further configured to perform repeatedly collecting remarks from the network through the network interface and storing them in the remark text storage device.

3. The credibility determining system according to claim 2, wherein each of the constraint conditions includes a time constraint condition or a geographical constraint condition to be established between a cause and a result of the causal relation; and in order to realize retrieval from the set of texts of the remarks, the processor is configured to perform:

estimating a time of occurrence of an item represented by the input information, based on time information obtained from the input information, and estimating a position of occurrence of an item represented by the input information based on geographical information obtained from the input information.

4. The credibility determining system according to claim 3, wherein in order to extract the remark, the processor is further configured to perform:

specifying a second causal relation having in the cause part thereof the input information or a text equivalent to the input information, from the causal relations stored in the causal relation storage device, and extracting, from the set of texts of the remarks, a remark having a content matching or equivalent to the result part of the specified second causal relation and satisfying the time constraint and the position constraint, respectively, stored in the causal relation storage device associated with the specified second causal relation, with the estimated time and the estimated position being points of references.

5. The credibility determining system according to claim 4, wherein the processor is further configured to perform extracting, from the set of texts of the remarks, for each the specified first or second causal relation, a remark contradicting a cause or a result of an item represented by the input information and satisfying the time constraint with the time of occurrence estimated for the input information being a point of reference and satisfying the position constraint with the position of occurrence estimated for the input information being a point of reference;

in order to perform the determination, the processor is configured to perform:

classifying each of the extracted remarks to a first type of remarks representing a cause of the item represented by the input information, to a second type of remarks representing a result of the item represented by the input information, and to a third type of remarks representing contradictions with the item represented by the input information, determining credibility of the input information as a function of the number of remarks classified to the first type, the number of remarks classified to the second type and the number of remarks classified to the third type, by the classification, and outputting the determined credibility; and wherein a value of the function changes with positive correlations with respect to the numbers of remarks classified to the first and second types, and changes with a negative correlation with the number of remarks classified to the third type.

6. The credibility determining system according to claim 4, wherein in order to perform the determination, the processor is configured to perform:

classifying each of the extracted remarks to a first type of remarks representing a cause of the item represented by the input information and a second type of remarks representing a result of the item represented by the input information, determining credibility of the input information as a function of the number of remarks classified to the first type and the number of remarks classified to the second type, and outputting the determined credibility.

7. The credibility determining system according to claim 6, wherein the function has a positive correlation with the number of remarks classified to the first type and the number of remarks classified to the second type.

8. The credibility determining system according to claim 7, wherein an increment of a value of the function per unit of change of the number of remarks classified to the first type is larger than an increment per unit of change of the number of remarks classified to the second type.

9. A computer-implemented credibility determining method for determining credibility of input information based on a set of texts of remarks on a network, wherein the computer includes:

a network interface connected to the network, and a non-transitory computer readable storage medium;

the non-transitory computer readable storage medium includes a causal relation storage device for storing pieces of causal relation knowledge, each piece of the causal relation knowledge including:
- a combination of a cause part consisting of a text representing a cause and a result part consisting of a text representing a result of the cause, and
- a time constraint and position constraint associated with the causal relation;

the non-transitory computer readable storage medium further includes a remark text storage device for storing a set of texts of the remarks;

the credibility determining method comprising the steps of:
- searching for and retrieving, from the causal relations stored in the causal relation storage device, a causal relation matching the input information,
- for each retrieved causal relation, specifying a constraint condition for retrieving a remark from the set of texts of the remarks based on a time constraint and a position constraint stored in the causal relation storage device in association with the causal relation;
- for each retrieved causal relation, retrieving, from the set of texts of the remarks, a remark satisfying the specified constraint condition and representing a cause or a result of an item represented by the input information, using the causal relation; and
- classifying each of the retrieved remarks to remarks representing causes of the item represented by the input information and to remarks representing results of the item represented by the input information, determining credibility of the input information based on results of classification, and outputting the result of determination, wherein the step of retrieving from the set of texts of the remarks includes the steps of:
- extracting, from the set of texts of the remarks, a remark having a content matching or equivalent to a causal part of the specified first causal relation and satisfying the time constraint and the position constraint, respectively, associated with the specified first causal relation, with the estimated time and the estimated position being points of references,
- specifying a second causal relation having in the cause part thereof the input information or a text equivalent to the input information, from the causal relations stored in the causal relation storage device, and
- extracting, from the set of texts of the remarks, a remark having a content matching or equivalent to a result part of the specified second causal relation and satisfying the time constraint and the position constraint, respectively, associated with the specified second causal relation, with the estimated time and the estimated position being points of references.

10. The credibility determining method according to claim 9, further comprising the step of repeatedly collecting remarks from the network through the network interface and storing collected remarks in the remark text storage device.

11. The credibility determining method according to claim 10, wherein
- each of the constraint conditions includes a time constraint condition or a geographical constraint condition to be established between a cause and a result of a causal relation; and
- the step of retrieving from the set of texts of the remarks includes the steps of:
  - estimating a time of occurrence of an item represented by the input information, based on time information obtained from the input information;
  - estimating a position of occurrence of an item represented by the input information based on geographical information obtained from the input information; and
  - extracting, from the set of texts of the remarks, for each retrieved causal relation, a remark representing a cause or a result of an item represented by the input information, which has a content satisfying the time constraint with the time of occurrence estimated for the input information being a point of reference or a content satisfying the position constraint with the position of occurrence estimated for the input information being a point of reference.

12. The credibility determining method according to claim 11, wherein
- the step of extracting a remark includes the steps of:
- specifying a first causal relation having in the result part thereof the input information or a text equivalent to the input information, from the causal relations stored in the causal relation storage device.

13. The credibility determining method according to claim 12, further comprising the step of
- extracting, from the set of texts of the remarks, for each specified first or second causal relation, a remark contradicting a cause or a result of an item represented by the input information and satisfying the time constraint with the time of occurrence estimated for the input information being a point of reference and satisfying the position constraint with the position of occurrence estimated for the input information being a point of reference; wherein
- the determining step includes the steps of:
- classifying each of the extracted remarks to a first type of remarks representing a cause of the item represented by the input information, a second type of remarks representing a result of the item represented by the input information, or a third type of remarks representing contradictions with the item represented by the input information,
- determining credibility of the input information as a function of the number of remarks classified to the first type, the number of remarks classified to the second type and the number of remarks classified to the third type, by the classification, and
- outputting the determined credibility; and wherein
- a value of the function changes with positive correlations with respect to the number of remarks classified to the first type and the number of remarks classified to the second type, and changes with a negative correlation with the number of remarks classified to the third type.

14. The credibility determining method according to claim 12, wherein
- the determining step includes the steps of:
- classifying each of the extracted remarks to a first type of remarks representing a cause of the item represented by the input information or a second type of remarks representing a result of the item represented by the input information,
- determining credibility of the input information as a function of the number of remarks classified to the first type and the number of remarks classified to the second type, and
- outputting the determined credibility.

15. The credibility determining method according to claim 14, wherein the function has a positive correlation with the number of remarks classified to the first type and the number of remarks classified to the second type.

16. The credibility determining method according to claim 15, wherein an increment of a value of the function per unit of change of the number of remarks classified to the first type is larger than an increment per unit of change of the number of remarks classified to the second type.

17. A non-transitory computer-readable storage medium having stored thereon a computer program for controlling a computer such that, based on a set of remarks on a network, the computer determines credibility of input information, wherein:

the computer includes:
a network interface connected to the network, and
the non-transitory computer readable storage medium;

the non-transitory computer readable storage medium includes a causal relation storage device for storing pieces of causal relation knowledge, each piece of the causal relation knowledge including a combination of a cause part consisting of a text representing a cause and a result part consisting of a text representing a result of the cause, and a time constraint and a position constraint associated with the causal relation;

the non-transitory computer readable storage medium further includes a remark text storage device for storing a set of texts of the remarks;

the computer program is configured to cause the computer to perform the steps of:

searching for and retrieving, from the causal relations stored in the causal relation storage device, a causal relation matching the input information, and for each retrieved causal relation, specifying a constraint condition for retrieving a remark from the set of texts of the remarks based on a time constraint and a position constraint stored in the causal relation storage device in association with the causal relation;

for each retrieved causal relation, retrieving, from the set of texts of the remarks, a remark satisfying the specified constraint condition and representing a cause or a result of an item represented by the input information, using the causal relation knowledge; and classifying each of the retrieved remarks to those remarks representing causes of the item represented by the input information or to those remarks representing results of the item represented by the input information, determining credibility of input information based on results of classification, and outputting the result of determination from the computer, wherein the step of retrieving from the set of texts of the remarks includes the steps of:

extracting, from the set of texts of the remarks, a remark having a content matching or equivalent to a causal part of the specified first causal relation and satisfying the time constraint and the position constraint, respectively, associated with the specified first causal relation, with the estimated time and the estimated position being points of references, specifying a second causal relation having in the cause part thereof the input information or a text equivalent to the input information, from the causal relations stored in the causal relation storage device, and extracting, from the set of texts of the remarks, a remark having a content matching or equivalent to a result part of the specified second causal relation and satisfying the time constraint and the position constraint, respectively, associated with the specified second causal relation, with the estimated time and the estimated position being points of references.

18. The storage medium according to claim 17, wherein each of the constraint conditions includes a time constraint condition or a geographical constraint condition to be established between a cause and a result of the causal relation; and the step of retrieving includes the steps of:

estimating a time of occurrence of an item represented by the input information, based on time information obtained from the input information;

estimating a position of occurrence of an item represented by the input information based on geographical information obtained from the input information; and extracting, from the set of texts of the remarks, for each retrieved causal relation, a remark representing a cause or a result of an item represented by the input information, which has a content satisfying the time constraint with the time of occurrence estimated for the input information being a point of reference or a content satisfying the position constraint with the position of occurrence estimated for the input information being a point of reference.

* * * * *